(12) United States Patent
Meranda

(10) Patent No.: US 10,688,530 B2
(45) Date of Patent: Jun. 23, 2020

(54) APPARATUS, SYSTEM AND METHOD FOR FASTENING A SCREEN ON A GYRATORY SIFTER WITH AN INTEGRATED SCREEN SEAL

(71) Applicant: M-I LLC, Houston, TX (US)

(72) Inventor: Christopher T. Meranda, Union, KY (US)

(73) Assignee: M-I L.L.C., Houston, TX (US)

( * ) Notice: Subject to any disclaimer, the term of this patent is extended or adjusted under 35 U.S.C. 154(b) by 881 days.

(21) Appl. No.: 15/145,765

(22) Filed: May 3, 2016

(65) Prior Publication Data

US 2017/0320097 A1    Nov. 9, 2017

(51) Int. Cl.

| | | |
|---|---|---|
| *B07B 1/48* | (2006.01) | |
| *B01D 35/02* | (2006.01) | |
| *B01D 29/01* | (2006.01) | |
| *B01D 35/20* | (2006.01) | |
| *B01D 33/03* | (2006.01) | |
| *B01D 29/09* | (2006.01) | |

(52) U.S. Cl.
CPC ............... *B07B 1/48* (2013.01); *B01D 29/01* (2013.01); *B01D 29/09* (2013.01); *B01D 33/0376* (2013.01); *B01D 35/02* (2013.01); *B01D 35/20* (2013.01); *B01D 2201/34* (2013.01); *B01D 2201/4092* (2013.01); *B07B 2201/02* (2013.01)

(58) Field of Classification Search
CPC ....... B07B 1/48; B07B 2201/02; B01D 29/01; B01D 29/09; B01D 33/0376; B01D 35/02; B01D 35/20; B01D 2201/34; B01D 2201/4092

USPC .......................................................... 210/767
See application file for complete search history.

(56) References Cited

U.S. PATENT DOCUMENTS

| | | | |
|---|---|---|---|
| 4,529,510 A | | 7/1985 | Johnson et al. |
| 5,485,924 A | * | 1/1996 | Zaun ........................ B07B 1/18 |
| | | | 209/300 |
| 6,935,511 B2 | | 8/2005 | Seyffert et al. |
| 7,175,027 B2 | | 2/2007 | Strong et al. |
| 7,278,540 B2 | | 10/2007 | Stotne et al. |
| 7,571,817 B2 | | 8/2009 | Scott et al. |
| 9,079,222 B2 | | 7/2015 | Burnett et al. |
| 2004/0245153 A1 | * | 12/2004 | Seyffert ............. B01D 33/0376 |
| | | | 209/372 |

(Continued)

OTHER PUBLICATIONS

International Search Report and Written Opinion for the equivalent International patent application PCT/US2017/029516 dated Aug. 3, 2017.

(Continued)

*Primary Examiner* — Robert Clemente
*Assistant Examiner* — Akash K Varma
(74) *Attorney, Agent, or Firm* — Jeffrey D. Frantz

(57) ABSTRACT

An apparatus, system and method have a rod attached to and extending across a screen to engage with a receptacle. A box is positioned beneath the filtration screen. An air bag is activated to inflate the filtration screen to compress against a plate. A junction extends from the plate, and the air bag rises to move the junction toward the receptacle to compress the rod against the receptacle to hold the rod. The filtration screen may be constructed from mesh material sized to permit materials to flow through the filtration screen. A vibratory element in the box vibrates to assist filtration.

7 Claims, 1 Drawing Sheet

(56) References Cited

U.S. PATENT DOCUMENTS

2006/0102527 A1* 5/2006 Kato ..................... B07B 1/18
209/411

OTHER PUBLICATIONS

International Preliminary Report on Patentability for the equivalent International patent application PCT/US2017/029516 dated Nov. 15, 2018.
Office Action for the equivalent German patent application 1120170023262 dated Mar. 22, 2019 including machine translation into English.

* cited by examiner

APPARATUS, SYSTEM AND METHOD FOR FASTENING A SCREEN ON A GYRATORY SIFTER WITH AN INTEGRATED SCREEN SEAL

BACKGROUND OF THE INVENTION

Sifters and vibratory separators are used in a variety of applications for separating materials by size. For example, sifters and vibratory separators may be used to separate sized particles or to separate solids from liquids. These devices may be used to screen materials in various industries for industrial sorting, manufacturing operations, oil and gas drilling and production operations, etc.

Gyratory sifters are used in a variety of applications for separating solids by size. These applications include separating particles of sugar, flour, sand and various chemical powders. Further, gyratory sifters may be used for both wet and dry screening and include aligned decks of screens or perforated plates, sloping from the head end and/or a feed end to the tail end and/or discharge end of the sifter. The screens may be disposed in a screen basket. The screen basket may be suspended by a set of hangers that allow the basket to move on a horizontal plane.

An eccentric drive mechanism, e.g., a belt driven eccentric weight, or other motive force may be coupled to the screen basket to provide a circular motion substantially across a horizontal plane of the gyratory sifter. Also, various dimensions and/or specifications of the gyratory sifter may be adjusted to accomplish specific separation and/or sifting goals. Devices described herein may be utilized to retain a screen within a gyratory sifter during operation as used in the oilfield and/or related industries.

DETAILED DESCRIPTION

Embodiments disclosed herein are applicable to separation devices that may be utilized in numerous industries. While specific embodiments may be described as utilized in the oilfield services and related industries, such as use with shale shakers, the device may be applicable in other industries where separation of liquid-solid, solid-solid and other mixtures may be separated. The embodiments may be utilized in the mining, pharmaceutical, food, medical or other industries to separate such mixtures.

In the following detailed description, reference is made to accompanying figures, which form a part hereof. In the figures, similar symbols or identifiers typically identify similar components, unless context dictates otherwise. The illustrative embodiments described herein are not meant to be limiting. Other embodiments may be utilized, and other changes may be made, without departing from the spirit or scope of the subject matter presented here. It will be understood that the aspects of the present disclosure, as generally described herein, and illustrated in the figures, may be arranged, substituted, combined and designed in a wide variety of different configurations, which are explicitly contemplated and form part of this disclosure.

Figure 1:
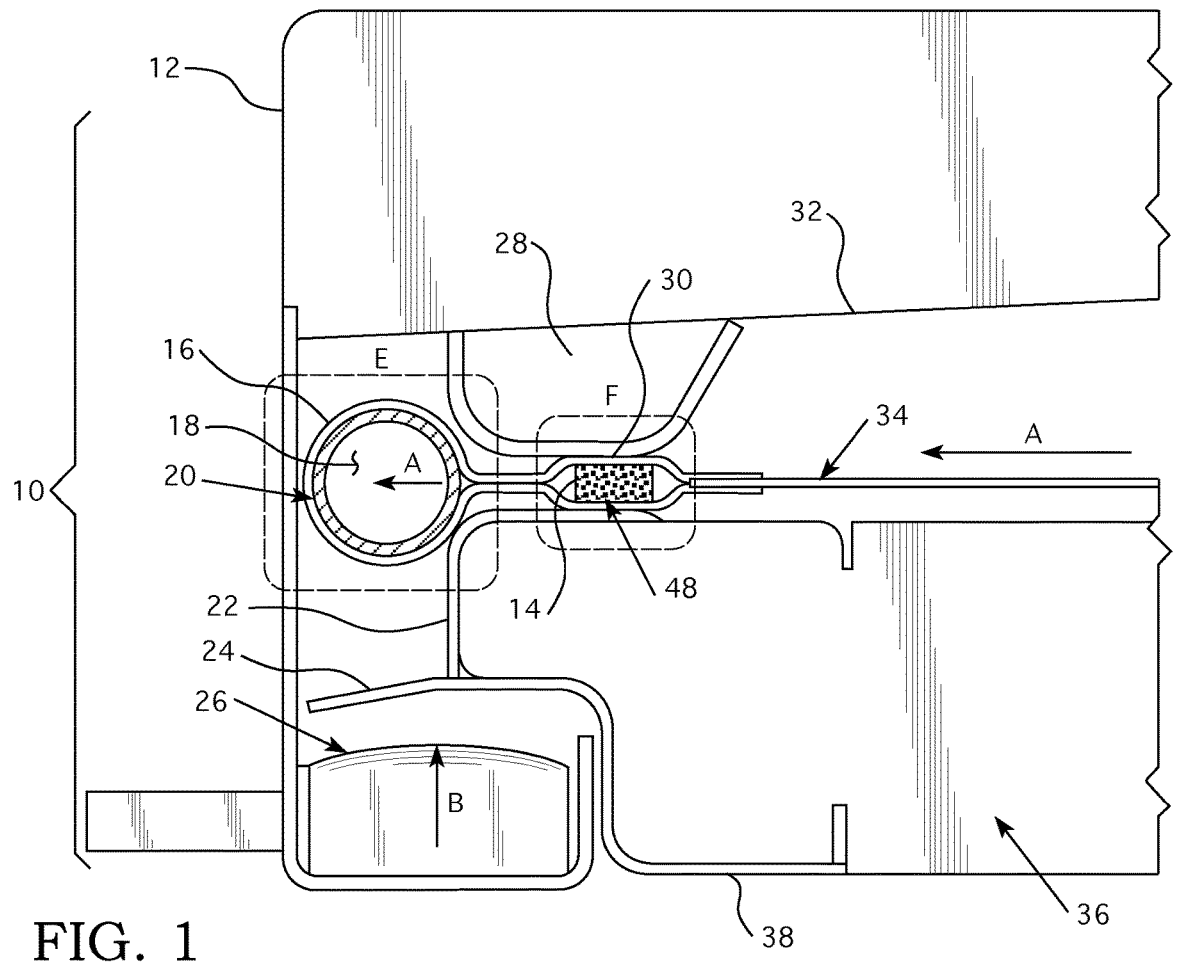
FIG. 1 illustrates a side view of an integrated screen seal mounted in a gyratory sifter in accordance with an embodiment of the invention.

Referring to FIG. 1, a side view of a screen fastening system 10 with a rod 20 attached to and extending across a filtration screen 34 is shown. In an embodiment, the screen fastening system 10 may be referred to as "a receptacle". The filtration screen 34 may filter and/or sift a solid-solid mixture flowing through the filtration screen 34. The filtration screen 34 may be generally rectangular in shape with parallel edges. Further, the rod 20 may enclose an interior 18. The filtration screen 34 may be constructed from mesh material sized to permit materials to flow and/or to pass through the filtration screen 34. For example, the filtration screen 34 may trap and/or collect solid materials while permitting liquid to flow through the filtration screen 34.

A box 36 may be positioned generally beneath the filtration screen 34 and may assist in the vibration and/or gyration of the filtration screen 34 during use to separate solids from liquid flowing through the filtration screen 34. The box 36 may be referred to as a "ball box" in the separation industry and or vibratory separation industries. Although shown in a specific orientation in FIG. 1, a person of ordinary skill in the art will appreciate that the size, shape, layout and/or orientation of the box 36 should not be limited to such an embodiment. An underside 38 of the box 36 may partially enclose an inflatable bladder 26. In an embodiment, other types of mechanisms and/or devices may be used to apply force to and/or upon the box, including pneumatic pumps and electric and/or hydraulic lifts, for example. Upon activation and/or actuation, the inflatable bladder 26 may inflate and/or rise generally in the direction B as shown in FIG. 1.

Expansion and/or rising of the inflatable bladder 26 in the direction B may cause the inflatable bladder 26 to contact and/or compress against a holding plate 24 that may extend from and/or be integrally formed with the underside 38. While the inflatable bladder 26 may be deactivated, the holding plate 24 along the underside 38 and/or the box 36 may hold the inflatable bladder 26 within the screen fastening system 10. The inflatable bladder 26, upon activation, may receive air and/or other gas to expand and/or inflate to rise in a direction B to cause an intermediate junction 22 to likewise rise and/or move. Movement of the intermediate junction 22 toward an outer edge 12 of the screen fastening system may compress and seal a sealing gasket 48 embedded in the filtration screen 34 against a protrusion 28 extending from a cross-member 32 extending lengthwise from the outer edge 12 itself as shown in FIG. 1. In an embodiment, the sealing gasket 48 may be removable and/or removed from the filtration screen 34. The intermediate junction 22 and/or the holding plate may force the rod 20 to pull and/or apply tension to the filtration screen 34. Compression of the rod 20 against the protrusion 28 and/or the outer edge 12 due to movement of the intermediate junction 22 in the direction B may retain the rod 20 during filtration operations.

The rod 20 may extend across an edge of the filtration screen 34 and may be substantially enclosed by the screen 34 that may wrap around the rod 20. In an embodiment, the rod 20 may be constructed from a flexible conduit and/or similar material. In an embodiment, the rod 20 may be removed from the filtration screen 34 to allow the filtration screen 34 to be rolled, folded and/or compressed as needed to facilitate transport and/or storage. A sealing region F may include the sealing gasket 48 with a top surface 30 that may be positioned adjacent to the outer edge 12 from the rod 20. The top surface 30 of the sealing gasket 48 may compress against the protrusion 28. The sealing gasket 48 may be surrounded by the filtration screen 34 and may rest upon the intermediate junction 22. Upward movement of the inflatable bladder 26 may shift the intermediate junction 22 which may, in turn, move the top surface 30 of the sealing gasket 48. The top surface 30 may compress against protrusion 28 to hold the filtration screen 34 against the protrusion 28 and/or the intermediate junction 22. In an embodiment, compression of the sealing gasket 48 against the protrusion 28 and/or the intermediate junction 22 may be referred to as forming an integrated screen seal.

At the outer edge 12 of the screen fastening system 10 may be an edge and/or rod region E that has the rod 20 abutted against and/or otherwise in contact with the protrusion 28 and/or the intermediate junction 22. In an embodiment, the rod 20 may have an adhesive resin layer 16 that may substantially surround the rod 20 to assist in attachment of the rod 20 with the protrusion 28 and/or the intermediate junction 22. Further, the adhesive resin layer 16 may be generally referred to as "bond tite" in the oilfield services industry.

The screen fastening system 10 may operate by activation of the inflatable bladder 26 that may expand to cause the intermediate junction 22 to rise toward the rod 20. Specifically, movement of the intermediate junction 22 may push the rod 20 and/or the sealing gasket 48 toward the outer edge 12 of the screen fastening system 10 in the direction A as shown in FIG. 1. Movement of the rod 20 in the direction A may apply tension of the filtration screen 34 in the direction A that may ensure uniform positioning of the filtration screen 34 on the box 36. Vibration and/or vibratory gyration of the box 36 may vibrate elements in the box 36 to assist in filtration of slurry passing through the filtration screen 34.

Figure 2:
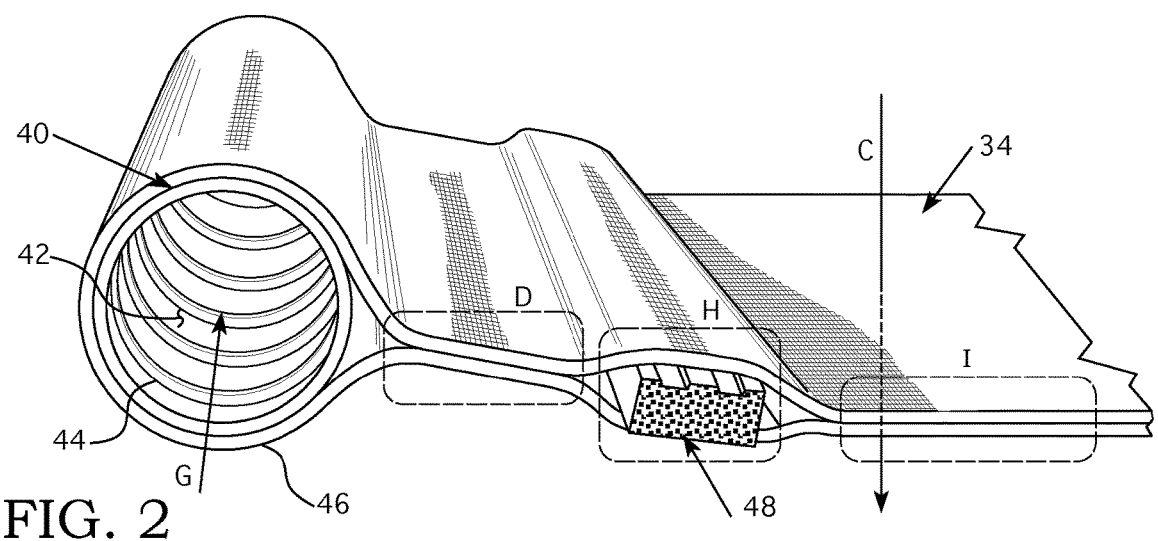
FIG. 2 illustrates a perspective view of a screen with a tube extending across the screen in accordance with an embodiment of the invention.

Referring to FIG. 2, the filtration screen 34 with the sealing gasket 48 and a tube 40 with a hollow interior 42 is shown. In an embodiment, the tube 40 may be substantially similar to the rod 20 shown in FIG. 1. The tube 40 may be made from a relatively rigid material, such as plastic, steel and/or a composite, and have circular ridges 44 that may surround an interior circumference of the tube 40. In an embodiment, the circular ridges 44 may assist in grasping and/or transporting the tube 40 and/or may provide guidance toward materials entering into the hollow interior 42 of the tube 40. The filtration screen 34 may coil and/or wrap around the tube 40 to create a loop 46 that attaches with the filtration screen 34 at a region D. A region H may be positioned adjacent to the region D where the filtration screen 34 may enclose the sealing gasket 48. In an embodiment, the filtration screen 34 may surround the tube 40 to form the loop 46 and may extend to a region I where the filtration screen may be substantially flat. Liquid may be separated from solids in slurry flowing through the filtration screen 10 in a direction C across the region I.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

The invention claimed is:

1. A system comprising:
 a screen that separates solids from liquid from a slurry passing through the screen;
 a rod threaded through the screen;
 a receptacle that receives the rod wherein a protrusion extends from the receptacle to compress against the rod;
 a sealing gasket on the screen wherein the protrusion compresses against the gasket to retain the rod in the receptacle;
 a junction beneath the screen wherein the rod compresses against the protrusion and the junction; and
 an air bag that expands to cause the junction to compress the rod and the sealing gasket toward the receptacle.

2. The system of claim 1 wherein an adhesive resin layer surrounds the rod to retain the rod in the receptacle.

3. The system of claim 1 further comprising:
 a box adjacent to the air bag wherein movement of the rod applies tension to the screen to position the screen on the box.

4. The system of claim 1 further comprising:
 a box adjacent to the air bag wherein the box vibrates the screen.

5. The system of claim 1 further comprising:
 a ridge that encircles an interior circumference of the rod.

6. The system of claim 1 wherein the screen wraps around the rod.

7. The system of claim 1 further comprising:
 a top surface of the sealing gasket wherein the top surface compresses the receptacle.

* * * * *